Patented Feb. 6, 1940

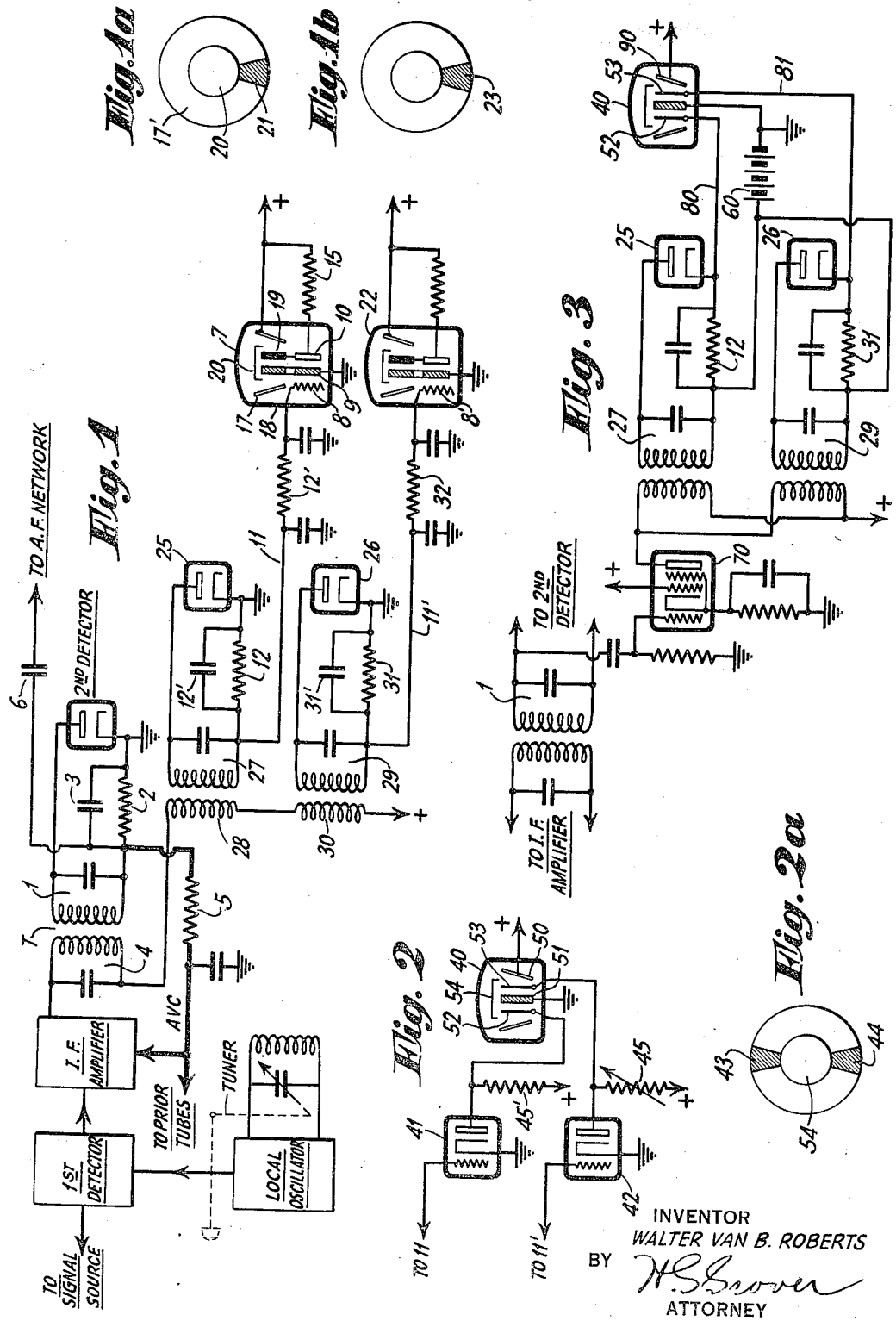

2,189,300

UNITED STATES PATENT OFFICE 2,189,300

TUNING INDICATOR CIRCUIT

Walter van B. Roberts, Princeton, N. J., assignor to Radio Corporation of America, a corporation of Delaware Application June 19, 1937, Serial No. 149,063

3 Claims. (Cl. 250—40)

My present invention relates to tuning indicator circuits for radio receivers, and more particularly to tuning indicator circuits employing indicator tubes of the cathode ray type which are capable of showing at all times whether a radio receiver is accurately tuned to an incoming signal or not.

There has been disclosed by H. M. Wagner in in U. S. Patent 2,051,189, granted Aug. 18, 1936, a tuning indicator tube having a fluorescent electrode which is rendered luminous, and has the appearance of a pattern of light; the pattern, in general, being circular in shape, and having a dark space, or gap, in the luminous ring which increases in width upon departure of the receiving apparatus from resonance. As disclosed in the aforesaid application, such an indicator tube is adapted for use in a radio receiver equipped with automatic volume control, and the indicator tube is known as a 6E5 type tube. In general, automatic volume control (AVC) voltage is employed automatically to regulate the width of the electrical shadow which is cast upon the fluorescent screen of the indicator tube.

Experience with this type of cathode ray indicator tube, in receivers equipped with AVC, demonstrates that it is not adapted to indicate the state of resonance of the receiver after the operator has been away from the receiver for a period of time. Since the width of the shadow cast upon the luminous screen of the indicator tube depends upon the signal strength at the receiver, a variation in signal strength may well be misinterpreted by the operator as a change in the state of tuning. For example, if the receiver is accurately tuned to resonance, and minimum shadow width is secured on the luminous screen of the indicator tube, a decrease in signal strength will cause a widening of the shadow of the indicator tube and cause the operator to believe that the set has become detuned.

In general, if the indicator tube depends upon the direct current output of a detector and the receiver is tuned to a point giving a maximum detector output current, the method is subject to three drawbacks. First, at a subsequent time the indicator does not show whether the receiver is still in tune, because the detector current may change as a result of changing signal strength as well as by the receiver drifting off tune. Secondly, in high fidelity receivers the tuning of the receiver may be varied over a considerable range of frequency without substantially affecting the direct current output of the detector, since high fidelity operation requires uniform transmission of a rather wide band of frequencies to the detector. Hence, there is no sharply defined maximum of detector current to act as an indication of correct tuning. Thirdly, such an indicator gives a different indication for each different strength of signal being received so that the user has no definite criterion of exact tuning with which to compare the indication of the indicator under all circumstances.

The main object of the present invention is, therefore, to provide a tuning indicator circuit which has a fixed condition for correct tuning regardless of signal strength so that at any time a condition of incorrect tuning is readily noticeable.

It is another object of my present invention to provide tuning indication means for a radio receiver equipped with AVC, wherein the indicator means is, in general, of the aforesaid tuning indicator tube type, but wherein the operator may at any time observe the state of tuning of the receiver and know that the indication is independent of the received signal strength.

Another object of my invention is to provide an indicating circuit comprising a pair of electronic indicator devices, one of them being actuated by a circuit tuned below a desired intermediate frequency and the other being actuated by a circuit tuned above this frequency, means being used for exciting said circuits equally with intermediate frequency voltage, and means being employed for adjusting said indicators to equality when the intermediate frequency is of the desired value.

According to the present invention one of these indicator tubes is energized from rectified voltage obtained from a circuit which is tuned slightly below the desired intermediate frequency, while a second tube is similarly connected to a circuit which is tuned slightly above the desired frequency. Both circuits are similarly supplied with signal voltage from the intermediate frequency system. It will be seen that if the intermediate frequency is correct, both circuits will be equally off tune, and, hence, the shadows in the two indicator tubes will be of the same width. If, however, the intermediate frequency departs from the desired value, it will come closer to the resonance frequency of one circuit and further from that of the other circuit, or vice versa, thus causing one or the other of the shadows to become the greater. Equality of shadow width is, therefore, the criterion of correct tuning. Incidentally, it may be noted that the direction of departure from correct tuning is indicated by which of the shadows is larger.

The novel features which I believe to be characteristic of my invention are set forth in particularity in the appended claims; the invention itself, however, as to both its organization and method of operation will best be understood by reference to the following description taken in connection with the drawing in which I have indicated diagrammatically several circuit organizations whereby my invention may be carried into effect.

In the drawing:

Fig. 1 is a circuit diagram of a portion of a superheterodyne receiver embodying one form of the present invention, Fig. 1a shows the appearance of the luminous screen of one indicator tube, Fig. 1b is a similar view of the luminous screen of the other indicator tube, Fig. 2 is a modified form of the invention, Fig. 2a shows the appearance of the luminous screen of the indicator tube of Fig. 2, and Fig. 3 is another modification.

Referring now to the accompanying drawing, wherein like reference characters in the different figures designate similar elements, in Fig. 1 there is shown schematically that portion of a superheterodyne receiving system which is essential to an understanding of this invention. The second detector of the receiving system is shown as a diode, and its anode is connected to its grounded cathode through a path including the I. F. input circuit I and the load resistor 2 arranged in series; the load resistor 2 being shunted by the I. F. by-pass condenser 3. The primary circuit 4 of the I. F. coupling transformer T is to be understood as being connected to the output of the first detector, or to the output circuit of the last I. F. amplifier. The circuits 4 and I are resonated to the operating I. F., and those skilled in the art will understand that the usual superheterodyne receiver networks are to be employed preceding circuit 4. Such networks usually comprise a signal collector which feeds a tunable radio frequency amplifier, and the latter feeding the first detector input circuit. A tunable local oscillator is also provided, and it is tunable over a frequency range which differs from the desired signal frequency range by a predetermined operating I. F., the latter may be chosen from a range of 175 k. c. to 450 k. c.

The direct current voltage developed across resistor 2 is used for AVC purposes; the AVC lead is connected through a filter resistor 5 to the anode side of load resistor 2. The AVC lead may be connected to any of the preceding signal transmission tubes in any manner well known to those skilled in this art. The audio voltage developed across resistor 2 is transmitted through condenser 6 to the audio frequency network, and the latter may be terminated by any desired type of reproducer.

The numeral 7 denotes in purely schematic manner a cathode ray tuning indicator tube of the 6E5 type. This type of tube has been disclosed, and claimed, in the aforesaid Wagner patent and, therefore, it is believed sufficient schematically to represent the tube 7 as shown in Fig. 1. In general, the tube is provided with an envelope, in which is disposed an amplifier section, and a shadow-producing section. The amplifier section comprises the grid 8, the cathode 9, and the plate 10. The grid 8 is connected by the lead 11 to the anode side of the load resistor 12. The lead 11 may include therein a filter network 12' for suppressing the pulsating component in the direct current voltage developed across load resistor 12. Proper energizing potentials are supplied to the indicator tube 7 from a direct current voltage supply source (not shown). The plate 10 may be connected through a resistor 15 to a desired positive potential point which is above ground.

The upper section of the indicator tube 7 comprises a fluorescent screen, or conical anode, 17. The cathode 9 is provided with a second cathode section 18, the latter being spaced from the cathode section 9, but being maintained at the same direct current potential as the cathode 9. The interior surface of the anode 17 is coated with a material which becomes luminous when electrons from cathode 18 fall thereon. The control element 19 is spaced from cathode 18, but is arranged in parallelism therewith, and thus provides an electrical shadow at a portion of the luminous screen. The control element 19 is connected by a direct current connection to the plate 10, and the former will assume a direct current potential which is equal to the direct current potential of the plate side of resistor 15. The numeral 20 denotes a cap, positioned approximately as shown in Fig. 1, which gives to the eye of the person viewing the indication end of the tube, the appearance of a luminous ring, and at the same time shields the eye from looking at the glowing cathode 18.

In Fig. 1a there is shown the appearance of the luminous screen of tube 7 when the shadow width is normal. This is the condition when the received signal is properly tuned in. The inner face 17' of anode 17 appears as a luminous annulus. As the direct current voltage impressed on grid 8 varies in magnitude, the width of shadow 21 will also change.

The indicator tube 7 need not have the amplifier section constructed as a triode, and this section may be of any other multi-electrode type. The cathode sections 9 and 18 are of the equi-potential type; and the control element 19 may be a rod, or a vane shaped from sheet material, and placed edgewise to the cathode 18. The anode 17 surrounds, and is concentric with, the emitter 18, and is preferably shaped like a dish pan, with an inner coating 17' which becomes fluorescent under electron bombardment. The cap 20, positioned over the top end of cathode 18, further functions to confine the electrons, and prevents electrons from reaching the glass walls of the envelope over the top of anode 17. In this type of tuning indicator the electrons travel radially outward from the cathode to the fluorescent coating 17' on the anode is a wide beam. The extent of the surface of the anode reached by the electron beam is determined by the voltage on the electrode 19. The more positive this electrode 19 is with respect to anode 17, the greater is the area of the anode covered by the beam, and the greater will be the area of the fluorescent portion of the anode.

A second cathode ray indicator tube 22, also of the 6E5 type, is provided; this tube is to be understood as being constructed exactly the same as tube 7. The viewing portion of tube 22 is shown in Fig. 1b, and the shadow 23 thereof will be as shown when the receiver is in tune. The I. F. energy in circuit 4 is impressed on diode rectifiers 25 and 26. Diode 25 has a resonant input circuit 27 which is tuned slightly below the I. F. carrier frequency value; the coil 28 impressing I. F. energy on tuned circuit 27. The diode 26 has a resonant input circuit 29 which is tuned slightly above the I. F. carrier value; coil 30 impressing the I. F. energy on the tuned circuit 29. Coils 28 and 30 are arranged in series with the primary coil of I. F. circuit 4, and are in the plate potential supply path of the I. F. amplifier.

The load resistor 12, shunted by the I. F. bypass condenser 12', develops a direct current voltage from rectified I. F. energy; the voltage being applied to grid 8 through the lead 11 connected to the ungrounded end of the load resistor. The resistor 31, shunted by the I. F. bypass condenser 31', provides the direct current voltage for the grid 8' of tube 22. The voltage is derived from rectified I. F. energy, and is impressed on grid 8' by lead 11' connected to the ungrounded side of the load resistor 31. The lead 11' includes a filter 32 for suppressing all pulsation components in the direct current voltage applied to grid 8'.

Both circuits 27 and 29 are similarly supplied with signal voltage from the I. F. amplifier; the two circuits are mistuned from the I. F. by equal amounts. If the I. F. energy is of the assigned frequency value, both circuits 27 and 29 will be equally off tune. Therefore, the shadow areas 21 and 23 will be of the same width, as shown in Figs. 1a and 1b. If, however, the I. F. energy departs from the desired value, one or the other of the two shadows will change in width depending on the direction of change of the I. F. value. Equality of shadow width is the criterion of correct tuning.

If, for example, the I. F. energy shifts towards circuit 27 in resonance, the anode side of resistor 12 becomes more negative thereby making grid 8 more negative. This cuts down the current flow through resistor 15, and electrode 19 becomes less negative with respect to the grounded cathode 18. As a result the electrode 19 repels less electrons, and the shadow 21 narrows. The shadow 23 will become narrow, in turn, when the I. F. energy shifts in frequency value to the frequency of circuit 29. The receiver operator needs only to adjust the tuner of the set until both shadows 21 and 23 are of equal width; when one shadow is relatively wide compared to the other it indicates that the receiver is detuned and in which direction.

Fig. 2 shows an arrangement similar in principle to Fig. 1, the difference being that the indicator tube 40 of Fig. 2 contains only the fluorescent discharge device, the triode amplifiers 41 and 42 which are built into the 6E5 tube being indicated as separate. It will be understood, of course, that both of these triodes may be enclosed within the same bulb, and that both of the diode rectifiers 25 and 26 could be enclosed in a common bulb. An advantage in making the indicator tube 40 separate is that it can be made shallower, thus allowing greater flexibility in cabinet design since the indicator must be mounted in such a way as to be readily visible. An advantage that lies in providing a double shadow within a single indicator tube is that the two shadows 43 and 44 to be compared are thus brought closer together for easier comparison, and the brightness of illumination of the non-shadowed portions is less apt to be different, which might confuse the comparison of shadow widths. In case any parts of the two systems do not have the same efficiency, an adjustment may be made as indicated by the variable plate resistance 45 of the lower triode 42.

It is understood, of course, that balancing adjustments might, also, be made at other points such as the coupling to circuits 27 or 29.

The tube 40 comprises the fluorescent anode 50 and the cathode 51. One control electrode 52 is disposed on one side of cathode 51, whereas the control electrode 53 is disposed on the other side thereof. The cap 54 functions in the manner described in connection with cap 20. The control electrode 52 is connected to the plate of the phase inversion tube 41, and the grid of the latter will be connected to the lead 11 of Fig. 1. The control electrode 53 is connected to the plate of the phase inversion tube 42, and the grid of the latter is connected to the anode side of resistor 31 as shown in Fig. 1. Resistor 45' is disposed in the plate current supply lead of tube 41. The shadows 43 and 44 in Fig. 2a are produced by electrodes 52 and 53 respectively.

Fig. 3 shows a modification of the method of Fig. 2 in that the intermediate frequency voltage is amplified so that further amplification between the rectifier outputs and the indicator tube is unnecessary. In this case a battery, or other source of voltage 60 is used to polarize the indicator shadow rods 52 and 53 in the absence of signals so as to produce shadows of such a width that any change in their relative widths is most readily noticeable. Incoming signals will decrease the widths of both shadows, but unless the receiver is accurately tuned they will become unequal. In this arrangement it is preferable to design the rectifier outputs not to exceed a value which will make a shadow of sufficient width to allow easy comparison of the two widths. This, of course, is easily accomplished by holding down the gain of the amplifier tube 70 feeding circuits 27 and 29, or by omitting this tube entirely and driving circuits 27 and 29 directly from some part of the intermediate frequency amplifier.

In this modification the amplifier 70 is fed with I. F. energy; the amplified energy is fed to circuits 27 and 29. The cathode side of load resistor 12 is connected by connection 80 to shadow electrode 52; the electrode 53 is connected by lead 81 to the cathode side of resistor 31. The anode terminals of resistors 12 and 31 are connected to the positive side of source 60; the negative terminal of the latter being at ground potential and connected to the cathode of tube 40. When no signals are received, shadows of a predetermined width are produced on the screen electrode 90. When the I. F. energy is of the correct frequency value the electrodes 52 and 53 are increased in positive potential by the drops across resistors 12 and 31; this results in an equal narrowing of the shadow angles. If the I. F. value shifts to resonance with circuit 27, for example, the electrode 52 increases in positive potential to a greater extent than electrode 53. In that case the shadow angle 43 decreases, while the shadow area 44 remains close to its initial width.

While I have indicated and described several systems for carrying my invention into effect, it will be apparent to one skilled in the art that my invention is by no means limited to the particular organizations shown and described, but that many modifications may be made without departing from the scope of my invention, as set forth in the appended claims.

What I claim is:

1. In a wave signaling system, an indicator tube provided with a cathode, a fluorescent anode at a positive direct current potential surrounding the cathode, and a pair of control electrodes disposed in the electron stream from the cathode to the anode, said control electrodes being disposed on opposite sides of the cathode, means mistuned from a desired signal for varying the direct current potential of one of said control electrodes and thereby varying the width of an electrical shadow produced on said anode by said one control electrode, and additional means oppositely mistuned from the said signal for varying the direct current potential of the other control electrode thereby to provide a second electrical shadow on said anode.

2. In a wave signaling system, an indicator tube provided with a cathode, a fluorescent anode at a positive direct current potential surrounding the cathode, and a pair of control electrodes disposed in the electron stream from the cathode to the anode, said control electrodes being disposed on opposite sides of the cathode, signal rectifier means mistuned from a desired signal frequency and responsive to variations in signal frequency for varying the direct current potential of one of said control electrodes and thereby varying the width of an electrical shadow produced on said anode by said one electrode, and oppositely mistuned signal rectifier means for varying the direct current potential of the other control electrode thereby to provide a second electrical shadow on said anode.

3. In a wave signaling system, a tube provided with a cathode, a fluorescent anode at a positive direct current potential surrounding the cathode, and a pair of control electrodes disposed at separated points in the electron stream from the cathode to the anode, rectifier means responsive to wave frequency departures in opposite directions from an assigned frequency value for producing direct current potentials variable in magnitude in opposite senses, means for applying direct current potential of one sense to one of said control electrodes and applying direct current potential of the opposite sense to the other control electrode whereby a pair of independent electrical shadows are produced on said anode.

WALTER van B. ROBERTS.